US012150913B2

(12) United States Patent
Bosscher et al.

(10) Patent No.: US 12,150,913 B2
(45) Date of Patent: Nov. 26, 2024

(54) COMPOUNDING SYSTEM

(71) Applicant: THE COMPOUNDING COMPANY B.V., Heemstede (NL)

(72) Inventors: Kasper Bosscher, Heemstede (NL); Luc Peter Eléonore Marie Kluskens, Heemstede (NL)

(73) Assignee: THE COMPOUNDING COMPANY B.V., Heemstede (NL)

( * ) Notice: Subject to any disclaimer, the term of this patent is extended or adjusted under 35 U.S.C. 154(b) by 0 days.

(21) Appl. No.: 18/705,943

(22) PCT Filed: Oct. 31, 2022

(86) PCT No.: PCT/NL2022/050608
§ 371 (c)(1),
(2) Date: Apr. 29, 2024

(87) PCT Pub. No.: WO2023/075600
PCT Pub. Date: May 4, 2023

(65) Prior Publication Data

US 2024/0325250 A1 Oct. 3, 2024

(30) Foreign Application Priority Data

Nov. 1, 2021 (NL) ...................................... 2029580
Feb. 23, 2022 (NL) ...................................... 2031054

(51) Int. Cl.
*A61J 1/20* (2006.01)
*A61J 3/00* (2006.01)
*B65B 3/00* (2006.01)

(52) U.S. Cl.
CPC ............. *A61J 1/2096* (2013.01); *A61J 3/002* (2013.01); *B65B 3/003* (2013.01)

(58) Field of Classification Search
CPC ............................... A61J 1/2096; B65B 3/003
See application file for complete search history.

(56) References Cited

U.S. PATENT DOCUMENTS 5,884,457 A * 3/1999 Ortiz ..................... B65B 7/2835 53/492
2002/0020459 A1* 2/2002 Baldwin ................. B65B 3/006 141/11
(Continued)

FOREIGN PATENT DOCUMENTS

EP 1997471 A1 12/2008
WO WO-2007130809 A2 * 11/2007 ............ A61M 5/008
WO 2011058560 A1 5/2011

OTHER PUBLICATIONS

International Search Report for PCT/NL2022/050608 mailed on Jan. 18, 2023, 8 pages.

*Primary Examiner* — Timothy P. Kelly
(74) *Attorney, Agent, or Firm* — AEON Law, PLLC; Adam L. K. Philipp; Charlotte E. Holoubek

(57) ABSTRACT

According to the invention, a compounding system (100) for dosing a compound in a container (10) comprising a first Luer coupling end (12) defining a first coupling axis (Af); wherein the compounding system comprises: a Luer coupling holder (110) for holding a second Luer coupling end (21) defining a second coupling axis (As), wherein the first Luer coupling end and the second Luer coupling end are shaped to couple for forming a Luer coupling; a container holder (120) for holding the container, wherein the Luer coupling holder and the container holder are arranged for aligning the first coupling axis and the second coupling axis; a rotation actuator (130) for rotating the container holder relative to the Luer coupling holder substantially around the first coupling axis; a translation actuator (140) for translating the container holder relative to the Luer coupling holder along the first coupling axis; bias means (150) arranged for biasing the first Luer coupling end and the second Luer coupling end when in contact in a direction of the first coupling axis; and a controller configured for controlling the (Continued)

rotation actuator, and the translation actuator for bringing the first Luer coupling end and the second Luer coupling end into engagement for establishing the Luer coupling.

20 Claims, 3 Drawing Sheets

(56) References Cited

U.S. PATENT DOCUMENTS

| | | | | |
|---|---|---|---|---|
| 2011/0062703 | A1* | 3/2011 | Lopez | A61M 39/22 285/129.1 |
| 2011/0100501 | A1* | 5/2011 | Mizuno | A61J 3/002 141/2 |
| 2017/0008651 | A1* | 1/2017 | Lizari Illarramendi | B65B 43/54 |
| 2022/0062107 | A1* | 3/2022 | Bianco | B25J 9/02 |

* cited by examiner

COMPOUNDING SYSTEM

RELATED APPLICATIONS

This application is a U.S. National Phase of PCT Patent Application No. PCT/NL2020/050489 having International filing date of Jul. 28, 2020, which claims the benefit of priority of Dutch Patent Application No. 2023588 filed on Jul. 29, 2019. The entire contents of the above-referenced applications and of all priority documents referenced in the Application Data Sheet filed herewith are hereby incorporated by reference for all purposes.

FIELD OF THE INVENTION

The invention relates to a compounding system. The invention more specifically relates to establishing a Luer coupling between the container and the compounding system. The invention further relates to a method for establishing a Luer coupling between the container and the compounding system. The invention further relates to a computer program product for the method or controller in the compounding system.

BACKGROUND OF THE INVENTION

Pharmacies, especially hospital pharmacies, have to compound medicines. These medicines may be compounded in the form of pills, but also in the form of syringes or infusion bags filled with a compounded substance. This compounding may be automated by coupling a syringe or infusion bag to a compounding system.

For example, US2017008651A1 discloses a machine and a method for the automatic preparation of substances for intravenous application. The machine works by puncturing a container with the needle of a syringe for thereafter drawing a liquid from the container in the syringe. US2017008651A1 further discloses in FIG. 8 a machine for establishing a Luer lock. Disadvantages of US2017008651A1 are that the machine is bulky, and mechanically complex. Furthermore, securely and reliably while also repeatably and automatically establishing a Luer coupling with the current soft plastics is difficult.

For example, WO 2007/130809 A2 discloses an automatic injectable drug mixing device including a syringe driver configured to receive a syringe in a predetermined syringe orientation and to operate the syringe in a predetermined series of linear movements, at least one needle configured to be coupled to the syringe during only part of a mixing operation including the predetermined series of linear movements, at least one vial containing a substance to be employed in mixing the drug and a precise positioner for maintaining the at least one vial and the at least one needle, when it is not coupled to the syringe, in precise mutual orientation with respect to each other and with respect to the syringe during at least part of the mixing operation. Disadvantages of WO 2007/130809 A2 are that the machine is unreliable, and mechanically complex. Furthermore, securely, and reliably while also repeatably and automatically establishing a Luer coupling with the current soft plastics is difficult.

SUMMARY OF THE INVENTION

An object of the invention is to overcome one or more of the disadvantages mentioned above. According to a first aspect of the invention, a compounding system for dosing a compound in a container comprising a first Luer coupling end defining a first coupling axis, and comprising a first thread having a first screw thread end, and a first pitch, wherein the compounding system comprises: a Luer coupling holder for holding a second Luer coupling end defining a second coupling axis, and comprising a second screw thread having a second thread end, and a second pitch, wherein the first Luer coupling end and the second Luer coupling end are shaped to couple for forming a Luer coupling, and wherein the first thread and the second thread engage for establishing the Luer coupling; a container holder for holding the container, wherein the Luer coupling holder and the container holder are arranged for aligning the first coupling axis and the second coupling axis; a rotation actuator for rotating the container holder relative to the Luer coupling holder substantially around the first coupling axis; a translation actuator for translating the container holder relative to the Luer coupling holder along the first coupling axis; bias means arranged for biasing the first Luer coupling end and the second Luer coupling end when in contact in a direction of the first coupling axis; a position sensor for sensing a container holder position of the container holder relative to the Luer coupling holder along the first coupling axis; and a controller configured for receiving the container holder position from the position sensor; activating the translation actuator such that the two Luer coupling ends contact and the bias means are biased; activating the rotation actuator when the first Luer coupling end and the second Luer coupling end contact in a non-engaging rotational direction; detecting a rotational position of the first thread end relative to the second thread end based on a sudden change of the container holder position; and controlling the rotation actuator, and the translation actuator for bringing the first Luer coupling end and the second Luer coupling end into engagement for establishing the Luer coupling.

A compounding system is a system arranged for compounding substances, such as liquids or gels. The compounded substance is typically collected in a container. Alternatively, the container collects the different substances making up the compounded substance. The container is typically used for transporting and/or temporarily storing the compounded substance. The compounded substance in the container may be administered to a patient.

The compounding system is typically used in medical settings, such as in a hospital pharmacy, for compounding syringes and/or infusion bags. The compounding system advantageously may alleviate manual labour. Furthermore, the compounding system may replace manual operation preventing failures. Both these advantages may also apply to the automated coupling and decoupling of the container.

The container is typically a syringe and/or infusion bag. Syringes and infusion bags are standardized in the medical sector. The container has a container body typically provided with an inner space or a volume for holding or containing the compounded substance. The container body may have an elongated shape defining an elongated axis. The elongated axis may be aligned with the first coupling axis. Furthermore, a container, such as a syringe or infusion bag, may be fitted with a Luer coupling end standardizing the coupling with the syringe or infusion bag. The compounding system holds a Luer coupling end shaped to cooperate or couple to the Luer coupling end of the container for forming a Luer coupling.

The Luer coupling between the first Luer coupling end and the second Luer coupling end is established in several steps. The first step is to align the first coupling axis of the first Luer coupling end and the second coupling axis of the second Luer coupling end while both coupling ends are facing each other. Thereafter, the first Luer coupling end and/or the second Luer coupling end are translated along the aligned coupling axes in a direction towards each other. When the first Luer coupling end and the second Luer coupling end contact each other, the translation is combined with a rotation, typically a right-hand rotation, of the first Luer coupling end relative to the second Luer coupling end around the aligned coupling axes. The rate of translation relative to the rate of rotation is based on the thread, more specific the thread pitch, of the Luer coupling ends. The translation and the rotation may both stop when either the first Luer coupling end reaches the end of the thread of the second Luer coupling end or vice versa, either Luer coupling end reaches an abutment in the other Luer coupling end. Alternatively, the translation and the rotation may be stopped after a particular distance or rotation is made or a set maximum driving torque is met. When the translation and the rotation are stopped, the Luer coupling is typically established.

The compounding system may comprise a frame. The rotation actuator has a rotation axis typically identical, substantially identical, aligned or substantially aligned to the first coupling axis. The rotation actuator rotates the container holder relative to the Luer coupling holder around the rotation axis. Typically, either the container holder or the Luer coupling holder are stationary in the frame, while the other is rotatable by the rotation actuator. The translation actuator translates the container holder relative to the Luer coupling holder along the rotation axis. Typically, either the container holder or the Luer coupling holder are stationary in the frame, while the other is translatable by the translation actuator. The combination of rotating around and translating along the rotation axis allows the compounding system to support the automated establishing of the Luer coupling and/or Luer connection.

The bias means bias the first Luer coupling end and the second Luer coupling end when in contact in a direction of the first coupling axis and/or rotation axis. The bias means typically indent or deform with an increasing or rising bias. At the first moment the first Luer coupling end and the second Luer coupling end contact, the bias is zero, substantially zero or neglectable. When the first Luer coupling end and the second Luer coupling end are now translated closer to each other along the first coupling axis, the bias means absorb this translation or displacement. Typically, the bias increases with this translation or displacement.

When the first Luer coupling end and the second Luer coupling end are brought into engagement typically the engagement requires a specific rotation and a specific translation at the same time. The specific rotation and the specific translation may vary over production batches, manufacturer and/or Luer coupling types. The bias means allow for a mismatch between the rotation and translation of the first Luer coupling end relative to the second Luer coupling end. In case of a mismatch, the bias means absorb this mismatch typically increasing or decreasing the bias. Hence, the current system allows for decoupling or loosely coupling the rotation and translation of the first Luer coupling end and the second Luer coupling end. This decoupling or loosely coupling provides the advantage of simplifying the control over the rotation actuator and/or the translation actuator. This decoupling or loosely coupling provides the advantage that the system may cope with variations over production batches, manufacturer and/or Luer coupling types. The bias may even be arranged such that the translation actuator is not activated during that the rotation actuator is activated for establishing the Luer coupling, thereby providing the advantage of fully decoupling the control over or powering of the rotation actuator relative to the translation actuator.

The position sensor senses the position of the container holder relative to the Luer coupling holder. Typically, the distance between the container holder and the first Luer coupling end along or in the direction of the first coupling axis is known, predefined or settable. Typically, the distance between the Luer coupling holder and the second Luer coupling end along or in the direction of the second coupling axis is known, predefined or settable. Therefore, typically the controller with the additional distance information may deduce or estimate the distance between the Luer coupling ends. And if the Luer coupling ends are in contact with each other, the controller may derive the amount of depression of the bias means. With additional parameters of the bias means, the controller may even deduce or estimate the amount of bias exerted on the Luer coupling ends. Typically, the controller may maintain or keep the exerted bias below a specific maximum bias threshold preventing deforming or even damage on the Luer coupling ends. Typically, the controller may determine or calculate if the depression is enough for providing the translation along the first coupling axis for establishing the Luer coupling, such as without activating the translation actuator.

When the first Luer coupling end and the second Luer coupling end are in contact, biased, and rotated in a non-engaging rotational direction, the two thread ends will contact each other. Typically, as long as the thread ends did not pass each other, the Luer coupling ends will separate from each other, move away from each other, or separate from each other along the first Luer coupling axis. The rate of separation may be determined depending on the pitch of the threads of the Luer coupling ends and the amount of rotation of the Luer coupling ends relative to each other. As soon as the thread ends pass each other, due to the bias, the thread ends will jump or suddenly change in a translational direction, such as along the first coupling axis. The jump or sudden change is typically substantially equal to the pitch of the thread ends. Typically, due to the sudden jump, the Luer coupling ends move towards each other.

The respective Luer coupling ends, or at least one of these ends, are typically of soft plastic. These soft plastics typically have no hard enough abutment causing the engaging Luer coupling ends to jump over or skip the abutment. The current invention allows to detect the position, specifically the angular position, of the respective thread end relative to each other. Thereafter the thread ends may engage using the knowledge of the relative position. The thread ends may thereafter advantageously engage without the Luer coupling ends, specifically the thread ends, jumping over or skipping each other's respective abutments. Furthermore, the threads may hereafter advantageously engage such that the Luer coupling ends couple without leaking fluids passing through the Luer coupling ends.

According to another aspect of the invention, a method for controlling a compounding system for dosing a compound in a container comprising a first Luer coupling end defining a first coupling axis, and comprising a first thread having a first screw thread end, and a first pitch; wherein the compounding system comprises: a Luer coupling holder for holding a second Luer coupling end defining a second coupling axis, wherein the first Luer coupling end and the second Luer coupling end are shaped to couple for forming a Luer coupling, and comprising a second screw thread having a second thread end, and a second pitch; a container holder for holding the container, wherein the Luer coupling holder and the container holder are arranged for aligning the first coupling axis and the second coupling axis; a rotation actuator for rotating the container holder relative to the Luer coupling holder substantially around the first coupling axis; a translation actuator for translating the container holder relative to the Luer coupling holder along the first coupling axis; bias means arranged for biasing the first Luer coupling end and the second Luer coupling end when in contact in a direction of the first coupling axis; and a position sensor for sensing a container holder position of the container holder relative to the Luer coupling holder along the first coupling axis; wherein the method comprises the step of receiving the container holder position from the position sensor; activating the translation actuator such that the two Luer coupling ends contact and the bias means are biased; activating the rotation actuator when the first Luer coupling end and the second Luer coupling end contact in a non-engaging rotational direction; detecting a rotational position of the first thread end relative to the second thread end based on a sudden change of the container holder position; and controlling the rotation actuator, and the translation actuator for bringing the first Luer coupling end and the second Luer coupling end into engagement for establishing the Luer coupling. The method provides the same advantages as mentioned for the compounding system.

According to another aspect of the invention, a computer program product comprising a computer readable medium having computer readable code embodied therein, the computer readable code being configured such that, on execution by a suitable computer or processor, the computer or processor is caused to perform any of the methods mentioned, or configuration of the controller of one of the compounding systems mentioned.

According to another aspect of the invention, a compounding system for dosing a compound in a container comprising a first Luer coupling end defining a first coupling axis; wherein the compounding system comprises: a Luer coupling holder for holding a second Luer coupling end defining a second coupling axis (As), wherein the first Luer coupling end and the second Luer coupling end are shaped to couple for forming a Luer coupling; a container holder for holding the container, wherein the Luer coupling holder and the container holder are arranged for aligning the first coupling axis and the second coupling axis; a rotation actuator for rotating the container holder relative to the Luer coupling holder substantially around the first coupling axis; a translation actuator for translating the container holder relative to the Luer coupling holder along the first coupling axis; bias means arranged for biasing the first Luer coupling end and the second Luer coupling end when in contact in a direction of the first coupling axis; and a controller configured for controlling the rotation actuator, and the translation actuator for bringing the first Luer coupling end and the second Luer coupling end into engagement for establishing the Luer coupling. The compounding system provides the same advantages as mentioned for the compounding system above and below.

According to another aspect of the invention, a method for controlling a compounding system for dosing a compound in a container comprising a first Luer coupling end defining a first coupling axis; wherein the compounding system comprises: a Luer coupling holder for holding a second Luer coupling end defining a second coupling axis, wherein the first Luer coupling end and the second Luer coupling end are shaped to couple for forming a Luer coupling; a container holder for holding the container, wherein the Luer coupling holder and the container holder are arranged for aligning the first coupling axis and the second coupling axis; a rotation actuator for rotating the container holder relative to the Luer coupling holder substantially around the first coupling axis; a translation actuator for translating the container holder relative to the Luer coupling holder along the first coupling axis; and bias means arranged for biasing the first Luer coupling end and the second Luer coupling end when in contact in a direction of the first coupling axis; wherein the method comprises the step of controlling the rotation actuator, and the translation actuator for bringing the first Luer coupling end and the second Luer coupling end into engagement for establishing the Luer coupling. The method provides the same advantages as mentioned for the compounding system.

DETAILED DESCRIPTION OF EXEMPLARY EMBODIMENTS

In an embodiment of the compounding system, the controller is configured for: activating the translation actuator such that the two Luer coupling ends contact and the bias means are biased; and after biasing, activating the rotation actuator for engaging the two Luer coupling ends, wherein the bias is sufficient for providing the translation of the container along the first coupling axis. This provides the advantage that the rotation actuator may be operated independent from the translation actuator thereby simplifying the control of the controller. The rotation actuator may remain stationary, uncontrolled, or unpowered while the translation actuator is activated or moving the first Luer coupling end, such as the container, relative to the second Luer coupling end along the first coupling axis. The translation actuator may remain stationary, uncontrolled, or unpowered while the rotation actuator is activated or rotating the first Luer coupling end, such as the container, relative to the second Luer coupling end around the first coupling axis.

In an embodiment of the compounding system, the bias is sufficient for providing a translation of the first Luer coupling end relative to the second Luer coupling end along the first coupling axis during the activation of at least 0.50, preferably 0.75, more preferably 1.0, more preferably 1.25, more preferably 1.5, more preferably 2.0, most preferably 2.5 of the first pitch and/or the second pitch. The Luer coupling ends when contacting and typically also biased may typically after rotating a specific or predefined number of radials in an engaging direction establish the Luer coupling. The Luer coupling during rotating in an engaging or establishing manner will induce a translation of the first Luer coupling end relative to the second Luer coupling end toward each other along the first coupling axis. The bias means may be arranged for providing the specified translation preferably taking into account that the bias means may be used during engaging and during searching for the relative rotational position of the first Luer coupling end and the second Luer coupling end, more specifically respectively the first thread end and the second thread end. Thus, the bias means provide translation room, respectively slack, for translating along the first coupling axis in an engaging as well as a non-engaging direction.

In an embodiment of the compounding system, the bias is sufficient for providing a translation of the first Luer coupling end relative to the second Luer coupling end along the first coupling axis during the activation of the rotation actuator in an engaging rotational direction of at least 0.25, preferably 0.40, more preferably 0.5, more preferably 0.75, most preferably 1.0 of the first pitch and/or the second pitch. The Luer coupling ends when contacting and typically also biased may typically after rotating a specific or predefined number of radials in an engaging direction establish the Luer coupling. The Luer coupling during rotating in an engaging or establishing manner will induce a translation of the first Luer coupling end relative to the second Luer coupling end toward each other along the first coupling axis.

In an embodiment of the compounding system, the bias means are sufficiently resilient for providing a translation of the first Luer coupling end relative to the second Luer coupling end along the first coupling axis during the activation of the rotation actuator in a non-engaging rotational direction of at least 0.50, preferably 0.75, more preferably 1.0, more preferably 1.25, most preferably 1.5 of the first pitch and/or the second pitch. The Luer coupling ends when contacting and typically also biased may typically after rotating a specific or predefined number of radials in a non-engaging direction detect the respective Luer thread ends. The Luer coupling during rotating in a non-engaging or non-establishing manner will induce a translation of the first Luer coupling end relative to the second Luer coupling end away from each other along the first coupling axis. If the embodiment provides a resilience of less than 1.0, the controller typically controls the translation actuator during rotation for providing the additional distance for detecting the sudden jump of the thread ends during rotating in a non-engaging direction. If the embodiment provides more resilience than 1.0, the control is simplified as the translation actuator may remain stationary during rotation of the thread ends in a non-engaging rotational direction.

In an embodiment of the compounding system, the controller is configured for: after detecting a rotational position activating the rotation actuator in an engaging rotational direction; and determining when the Luer coupling is established based on an angular displacement, preferably a predefined angular displacement, of the first Luer coupling end relative to the second Luer coupling end. Angular displacement may be a rotation over a particular number of radials. The control is advantageously simplified as the rotational means may advantageously be powered for a particular time or radials. The rotational means may advantageously comprise a stepper motor providing a simple means of determining the angular displacement.

In an embodiment of the compounding system, the controller is configured for: after detecting a rotational position activating the rotation actuator in an engaging rotational direction; and determining when the Luer coupling is established based on the container holder position. The container holder position may be sensed with the position sensor. The translation measured with the position sensor typically combined with knowledge of the thread pitch of the Luer coupling, provides the possibility to measure or determine when the Luer coupling is effectively made or coupled.

In an embodiment of the compounding system, the controller is configured for: activating the rotation actuator when the first Luer coupling end and the second Luer coupling end contact such that the two Luer coupling ends engage; and determining when the Luer coupling is established based on the container holder position. The container holder position may be sensed with the position sensor. The translation measured with the position sensor typically combined with knowledge of the thread pitch of the Luer coupling, provides the possibility to measure or determine when the Luer coupling is effectively made or coupled.

In an embodiment of the compounding system, the biasing means advantageously comprise a spring, a leaf spring, recoil spring, elastic material, and/or resilient material.

In an embodiment of the compounding system, the compounding system comprises a sensor adapted for sensing rotation of the rotation actuator for establishing the Luer coupling; and the controller is configured for switching off the rotation actuator when the sensed rotation falls below a rotation threshold. One of the Luer coupling ends may comprise one or more abutments abutting the other one of the Luer coupling ends. When rotating the Luer coupling ends in an engaging manner, the Luer coupling ends may abut on each other such that the rotation may only be continued with increased or higher rotational force. When the Luer coupling ends abut on each other, the rotational velocity may fall below a rotational velocity threshold, indicating an established Luer coupling.

In an embodiment of the compounding system, the sensed rotation is based on power applied to the rotation actuator; and the controller is configured for switching off the rotation actuator when the sensed power is indicative of an established Luer coupling, such as within a coupled power range, preferably exceeds a coupled power threshold. One of the Luer coupling ends may comprise one or more abutments abutting the other one of the Luer coupling ends. When rotating the Luer coupling ends in an engaging manner, the Luer coupling ends may abut on each other such that the rotation may only be continued with increased or higher rotational force. The increased or higher rotational force may exceed a threshold force for detecting that the Luer coupling ends abut on each other. In a further embodiment of the compounding system, the sensed power is advantageously based on the current supplied to and/or the voltage over the rotation actuator.

In an embodiment of the compounding system, the container is a medical container, such as a syringe or an infusion bag. In an embodiment of the compounding system, the container comprises a container body having an elongated shape, wherein preferably the elongated shape defines an elongated axis, and the elongated axis advantageously aligns with the first coupling axis. A substantially circular symmetrical container, preferably a substantially circular symmetrical container body and/or first Luer coupling end, provide ease of production and/or handling during filling of the container.

In an embodiment of the compounding system, the container comprises flanges extending from the container body; and the container holder is shaped for receiving the flanges for rotationally and/or translationally gripping the container. The container holder advantageously grips the flanges typically used by fingers during use such as expelling fluid from the container.

In an embodiment of the compounding system, the first Luer coupling end, the second Luer coupling end, and the Luer coupling are respectively the first Luer lock coupling end, the second Luer lock coupling end, and the Luer lock coupling. In an embodiment of the compounding system, the second Luer coupling end is a male or a female Luer coupling end. In an embodiment of the compounding system, the compounding system comprises a tube, and wherein the tube is arranged for fluidly connecting a reservoir and the second Luer coupling end. In an embodiment of the compounding system, the compounding system comprises a loading bay for loading a reservoir comprising the second Luer coupling end.

In an embodiment of the method for controlling the compounding system, the method comprises the steps of: activating the translation actuator such that the two Luer coupling ends contact and the bias means are biased; and after biasing, activating the rotation actuator for engaging the two Luer coupling ends, wherein the bias is sufficient for providing the translation of the container along the first coupling axis. This provides the advantage that the rotation actuator may be operated independent from the translation actuator thereby simplifying the control of the controller. The rotation actuator may remain stationary, uncontrolled, or unpowered while the translation actuator is activated or moving the first Luer coupling end, such as the container, relative to the second Luer coupling end along the first coupling axis. The translation actuator may remain stationary, uncontrolled, or unpowered while the rotation actuator is activated or rotating the first Luer coupling end, such as the container, relative to the second Luer coupling end around the first coupling axis.

BRIEF DESCRIPTION OF THE DRAWINGS

The invention will be apparent from and elucidated further with reference to the embodiments described by way of example in the following description and with reference to the accompanying drawings, in which.

The figures are purely diagrammatic and not drawn to scale. In the figures, elements which correspond to elements already described may have the same reference numerals.

LIST OF REFERENCE NUMERALS

| | |
|---|---|
| 10 | container |
| 11 | first Luer coupling part |
| 12 | first Luer coupling end |
| 13 | container body |
| 14 | flanges |
| 15 | plunger |
| 20 | compound supply |
| 21 | second Luer coupling part |
| 22 | second Luer coupling end |
| 100 | compounding system |
| 101 | frame |
| 110 | Luer coupling holder |
| 120 | container holder |
| 130 | rotation actuator |
| 131 | rotation motor |
| 132 | gear wheel driving container holder |
| 133 | rotation belt |
| 140 | translation actuator |
| 141 | translation motor |
| 142 | translation spindle |
| 143 | translation spindle nut |
| 144 | translation slider |
| 145 | translation belt |
| 150 | bias means |
| 151 | spring |
| 152 | spring holder |
| 160 | position sensor |
| 161 | detector |
| 162 | detection strip |
| 170 | container fill means |
| 171 | plunger motor |
| 172 | plunger spindle |
| 173 | plunger holder |
| 174 | plunger slider |

-continued

| | |
|---|---|
| 175 | plunger belt |
| 1000 | computer program product |
| 1010 | computer readable medium |
| 1020 | computer readable code |
| Af | first coupling axis |
| As | second coupling axis |
| Rrc | rotation container motor |
| Rtc | translation container motor |
| Rtp | translation plunger motor |
| Tc | translation container |
| Tp | translation plunger |

DETAILED DESCRIPTION OF THE FIGURES

The following figures may detail different embodiments. Embodiments can be combined to reach an enhanced or improved technical effect. These combined embodiments may be mentioned explicitly throughout the text, may be hint upon in the text or may be implicit.

Figure 1:
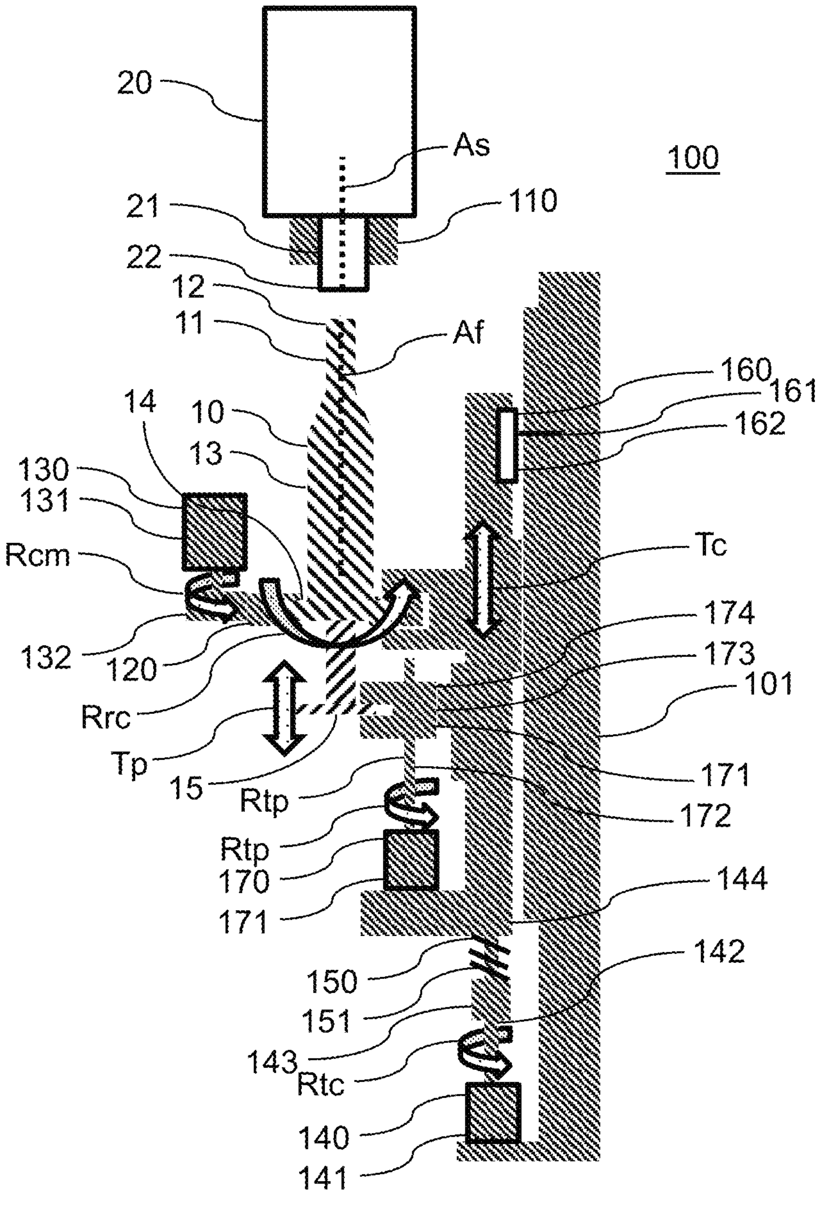
FIG. 1 schematically shows a side view of a cross section of a compounding system.

FIG. 1 schematically shows a side view of a cross section of a compounding system 100. The compounding system comprises a Luer coupling holder 110, a container holder 120, a rotation actuator 130, a translation actuator 140, bias means 150, and a controller. The compounding system may comprise a frame 101 arranged for providing a structure and/or mechanical reference to the compounding system and/or its features. The controller is not shown in FIG. 1. The compounding system is arranged for dosing a compound in a container 10. The container may comprise a container body 13. The container body typically encloses a volume for holding the doses compound. The container may comprise a first Luer coupling part 11 arranged to the container body, and a first Luer coupling end 12 which is a section of the first Luer coupling part and arranged at a distal end of the first Luer coupling part relative to the container body. The first Luer coupling part and/or the first Luer coupling end have a first coupling axis Af. The first coupling axis typically defines the elongated axis and/or the symmetry axis of the first Luer coupling part and/or the first Luer coupling end.

The Luer coupling holder is arranged for holding a second Luer coupling end 21. The Luer coupling holder may be arranged for holding a compound supply 20. The compound supply may be a vial or e.g. a tube to a larger reservoir. Alternatively, the tube may lead to a fluid valve allowing multiple reservoirs or vails to supply a compound or part of the compound. The compound, substances making up the compound, or parts of the compound are typically a fluid, a gel and/or a suspension. The compound supply may comprise a second Luer coupling part 21 arranged for providing the compound, substances making up the compound, or parts of the compound, and a second Luer coupling end 22 providing an opening for fluidly coupling to the first Luer coupling end and/or the first Luer coupling part. The second Luer coupling part and/or the second Luer coupling end have a second coupling axis As. The second coupling axis typically defines the elongated axis and/or the symmetry axis of the second Luer coupling part and/or the second Luer coupling end.

The container holder is arranged for holding the container. The container may comprise flanges 14. The flanges typically extend from the container body. The flanges are typically used for gripping the container for manipulating, such as moving, the container. The container holder may be arranged for gripping the flanges for coupling the container holder and the container in a rotational and translational manner and/or direction. The Luer coupling holder and the container holder are arranged for aligning the first coupling axis and the second coupling axis.

The rotation actuator is arranged for rotating the container holder relative to the Luer coupling holder substantially around the first coupling axis. The rotation actuator may comprise a rotation motor 131, and a gearwheel 132 driving the container holder. The rotation motor may be coupled with one end with the frame and with a driving axis to the gear wheel for rotating Rrc the gear wheel relative to the frame. The gear wheel may drive the container holder for rotating Rrc the container holder relative to the frame. The Luer coupling holder may be fixated relative to the frame. The rotation motor induces a rotation of the container therefore induces a rotation Rrc of the first Luer coupling end relative to the second Luer coupling end. Rotation is moving one object relative to another object around a rotation axis.

The translation actuator is arranged for translating the container holder relative to the Luer coupling holder along the first coupling axis. The translation actuator may translate the container relative to the frame along the first coupling axis. The translation actuator may comprise a translation motor 141, a translation spindle 142, a translation spindle nut 143, and a translation slider 144. The translation motor is arranged for directly or indirectly turning, driving and/or rotating Rtc the translation spindle. The translation slider may translate along the frame in a translation direction Tc translating the container typically substantially equal to the first coupling axis. The translation slider is typically rotationally fixated to the frame. The slider may slide along the frame in a direction of the first coupling axis. The translation spindle nut is typically rotationally fixated to the slider. The translation motor may be fixated to the frame with one end and have an axis rotating Rtc relative to the frame. When the translation spindle rotates, the translation spindle nut travels along the translation spindle for inducing a translation Tc of the translation spindle nut and may induce a translation Tc of the translation slider. Translating is moving one object relative to another object along a straight line or substantially straight line.

The bias means are arranged for biasing the first Luer coupling end and the second Luer coupling end when in contact in a direction of the first coupling axis. The bias means may comprise a spring 151. The bias means, such as the spring, may be arranged between the translation slider and the translation spindle nut. The bias means typically provide a rotational fixation of the translation slider and the translation spindle nut. Typically, if the translation slider and the translation spindle nut translate over the same distance, the bias provided by the bias means remains the same. Typically, if the translation slider and the translation spindle nut translate over an unequal distance, the bias provided by the bias means changes. The bias means typically provide a limited amount of translational freedom between the translation spindle nut and the translation slider.

After bringing the first Luer coupling end and the second Luer coupling end in contact, the translation slider may be translated or moved in a direction necessary for bringing the first Luer coupling end and the second Luer coupling end in contact and/or in a direction further pressing the first Luer coupling and the second Luer coupling end together. The effect of the bias means is that this translation induces a bias biasing the contacting the first Luer coupling end and the second Luer coupling end together or towards each other. After biasing the first Luer coupling end and the second Luer coupling end, the rotation actuator may be activated for establishing the Luer coupling between the first Luer coupling end and the second Luer coupling end. Depending on the amount of bias, the translation actuator may be activated during this rotation loosely associated with the rate of rotation of the rotation actuator, or may even remain stationary or unpowered during rotation of the rotation actuator. This provides the advantage of simplifying or easing the control over the rotation actuator and the translation actuator.

The compounding system may comprise a position sensor 160. The position sensor is arranged for sensing a container holder position of the container holder relative to the Luer coupling holder along the first coupling axis and/or translation container direction Tc. The position sensor may comprise a detector 161, and a detector strip 162. The detector strip may be fixated on the translation slider. The detector may be fixated to the frame. The detector is typically arranged to the detector strip such that the position and/or the change of the position of the slider relative to the frame may be measured. Typically, the first Luer coupling end relative to the Luer container holder is known, predefined or can be deduced. Typically, the second Luer coupling end relative to the Luer coupling holder is known, predefined or can be deduced.

Alternatively, a method for deducing when the first Luer coupling end and the second Luer coupling end contact may comprise the steps of: translating the first Luer coupling end and the second Luer coupling end towards each other; detecting during translating when the position sensor does not sense a change in position; and if no change of position is sensed optionally stopping translating towards each other. When the position sensor does not sense a change in position, the first Luer coupling end and the second Luer coupling end contact each other. Furthermore, if during the translation towards each other at first instance a position change is sensed, the method may be stopped when the first Luer coupling end and the second Luer coupling end first make contact with each other. This advantageously allows to control the amount of bias and/or indentation provided by the bias means. The method may also comprise the steps of before translating towards each other, translating the first Luer coupling end and the second Luer coupling end away from each other; detecting during translating away from each other when the position sensor does sense a change in position; and if a change of position is sensed stopping translating away from each other. When the position sensor does sense a change in position, the first Luer coupling end and the second Luer coupling end do not contact each other. With the additional steps, the first moment of contact may be determined even when the first Luer coupling end and the second Luer coupling end contact each other at the start of the method. The preceding additional method steps may also only be performed if when first translating the first Luer coupling end and the second Luer coupling end towards each other, it is detected that the first Luer coupling end and the second Luer coupling end are already in contact. The method may comprise the step of continuing translating the first Luer coupling end and the second Luer coupling end towards each other for a predefined distance and/or time. This step advantageously provides a specified or predetermined amount of bias and/or indentation.

The container such as a syringe may comprise a plunger 15. The plunger is typically arranged partly in the container body for controlling the volume held in the container body. The compounding system may comprise container fill means 170. The container fill means are arranged for controlling the filling and/or volume contained in the container, typically the container body. The container fill means may comprise a plunger motor 171, a plunger spindle 172, a plunger holder 173, and a plunger slider 174. The plunger slider may be rotationally fixated to the translation slider. The plunger slider may be translationally and/or movable along the translation slider. The plunger holder is shaped and arranged for holding the plunger and/or any other means controlling the volume of the container. The plunger slider and the plunger holder may form a single body and are typically fixated relative to each other. The plunger motor may be fixated at one end to the translation slider. The plunger motor may directly or indirectly rotate Rtp or drive a plunger spindle. The plunger slider may comprise an opening with a thread engaging the plunger spindle. When the plunger spindle is rotated, the plunger slider and thus the plunger is translated Tp along an axis equal or substantially equal to the first coupling axis.

Figure 2:
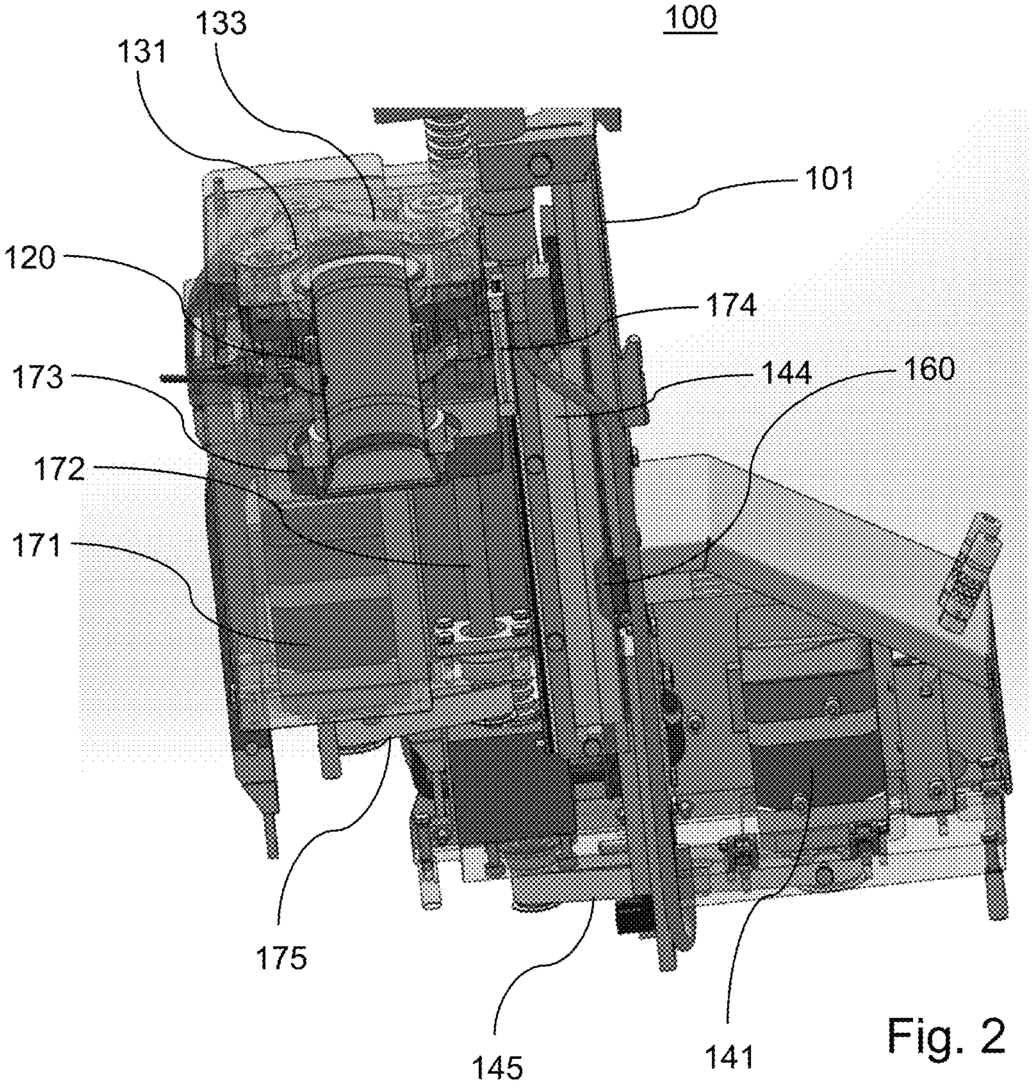
FIG. 2 schematically shows a perspective view of a compounding system.

FIG. 2 schematically shows a perspective view of a compounding system 100. Parts of the compounding system are shown transparent. Parts of the compounding system are shown in a cross-sectional view. Parts of the compounding system are left out for clarity purposes only without impeding the disclosure of the invention. Shown is an embodiment wherein the translation actuator comprises a translation belt 145 for indirectly driving or rotating the translation spindle. Shown is an embodiment wherein the rotation actuator comprises a rotation belt 133 for indirectly driving or rotating the container holder. Shown is an embodiment wherein the container fill means comprise a plunger belt 175 for indirectly driving or rotating the plunger spindle.

Figure 3:
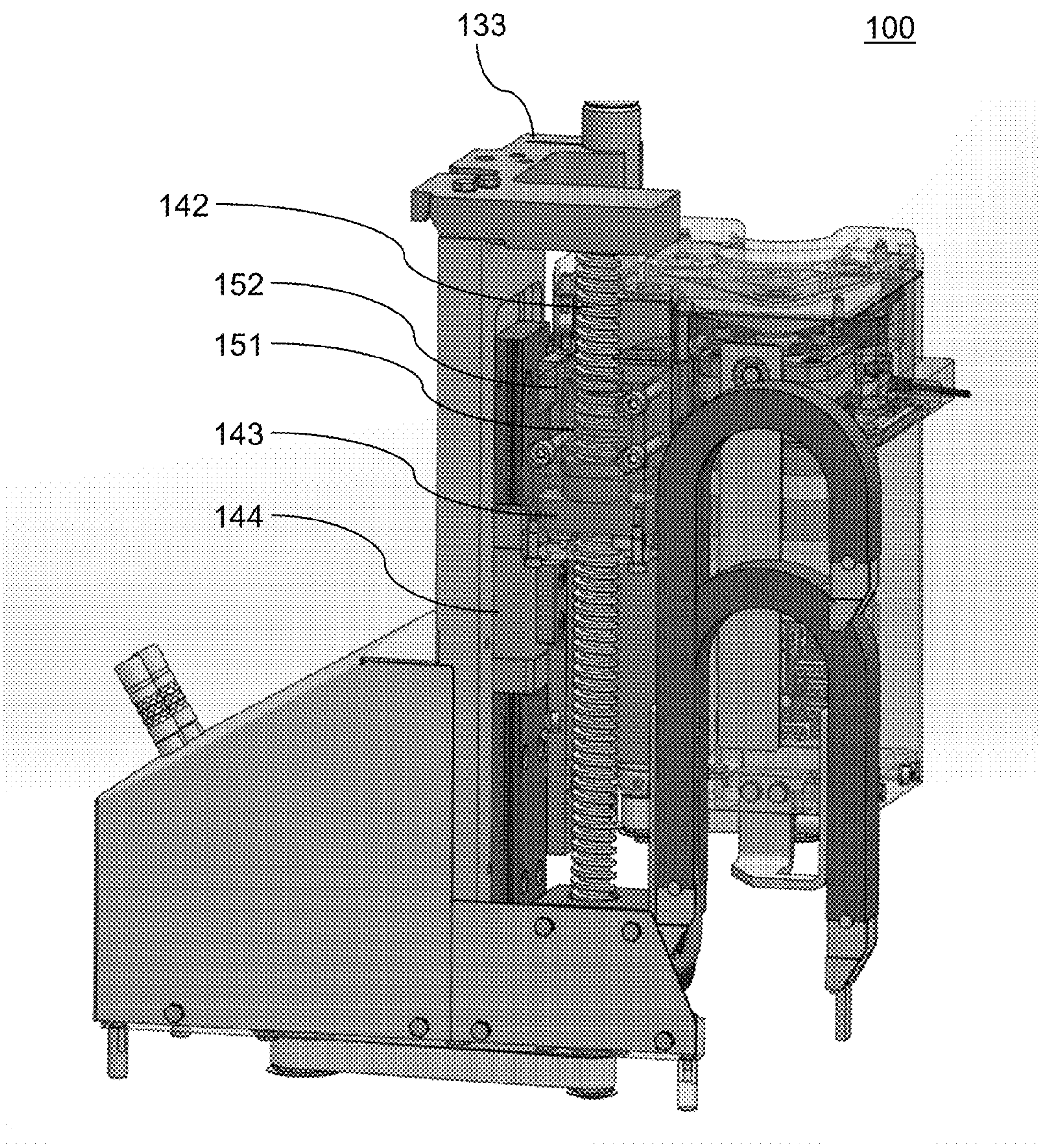
FIG. 3 schematically shows a perspective view of a compounding system.

FIG. 3 schematically shows a perspective view of a compounding system 100. Parts of the compounding system are shown transparent. Parts of the compounding system are shown in a cross-sectional view. Parts of the compounding system are left out for clarity purposes only without impeding the disclosure of the invention. Shown is an embodiment wherein the bias means comprise a spring holder 152. The spring holder is fixated or an integral part of the translation slider. The spring holder comprises a through hole for arranging the translation spindle in this through hole. The through hole is stepped, such that the spring arranged in the through hole abuts on one end of the stepped through hole and abuts on the other end of the through hole on the translation spindle nut arranged on the other end of the stepped through hole. The translation spindle nut is arranged in the spring holder such that the translation spindle nut may translate inside the stepped through hole opening relative to the spring holder but is limited or prevented from rotating relative to the spring holder. This allows for a simple and effective bias means. The spring holder, spring and translation spindle nut are typically arranged such that gravity provides compression for simplifying the design of the bias means.

Figure 4:
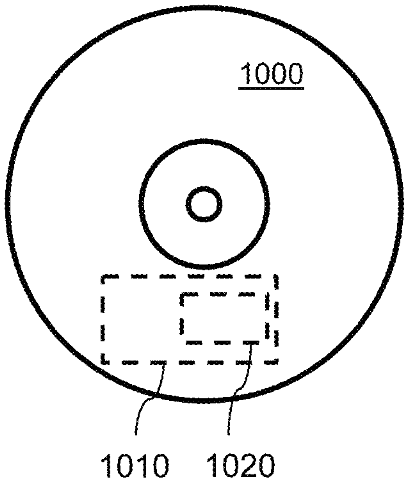
FIG. 4 schematically shows an embodiment of a computer program product, computer readable medium and/or non-transitory computer readable storage medium according to the invention.

FIG. 4 schematically shows an embodiment of a computer program product 1000, computer readable medium 1010 and/or non-transitory computer readable storage medium according to the invention comprising computer readable code 1020.

It will also be clear that the above description and drawings are included to illustrate some embodiments of the invention, and not to limit the scope of protection. Starting from this disclosure, many more embodiments will be evident to a skilled person without departing from the scope of the invention as set forth in the appended claims. These embodiments are within the scope of protection and the essence of this invention and are obvious combinations of prior art techniques and the disclosure of this patent. Devices functionally forming separate devices may be integrated in a single physical device.

The term “substantially” herein, such as in “substantially all emission” or in “substantially consists”, will be understood by the person skilled in the art. The term “substantially” may also include embodiments with “entirely”, “completely”, “all”, etc. Hence, in embodiments the adjective substantially may also be removed. Where applicable, the term “substantially” may also relate to 90% or higher, such as 95% or higher, especially 99% or higher, even more especially 99.5% or higher, including 100%. The term “comprise” also includes embodiments wherein the term “comprises” means “consists of”. The term “functionally” will be understood by, and be clear to, a person skilled in the art. The term “substantially” as well as “functionally” may also include embodiments with “entirely”, “completely”, “all”, etc. Hence, in embodiments the adjective functionally may also be removed. When used, for instance in “functionally parallel”, a skilled person will understand that the adjective “functionally” includes the term substantially as explained above. Functionally in particular is to be understood to include a configuration of features that allows these features to function as if the adjective “functionally” was not present. The term “functionally” is intended to cover variations in the feature to which it refers, and which variations are such that in the functional use of the feature, possibly in combination with other features it relates to in the invention, that combination of features is able to operate or function. For instance, if an antenna is functionally coupled or functionally connected to a communication device, received electromagnetic signals that are receives by the antenna can be used by the communication device. The word “functionally” as for instance used in “functionally parallel” is used to cover exactly parallel, but also the embodiments that are covered by the word “substantially” explained above. For instance, “functionally parallel” relates to embodiments that in operation function as if the parts are for instance parallel. This covers embodiments for which it is clear to a skilled person that it operates within its intended field of use as if it were parallel.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. Thus, these terms are not necessarily intended to indicate temporal or other prioritization of such elements.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb “to comprise” and “to include”, and its conjugations does not exclude the presence of elements or steps other than those stated in a claim. Also, the use of introductory phrases such as “at least one” and “one or more” in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The article "a" or "an" preceding an element does not exclude the presence of a plurality of such elements.

The invention may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterising features described in the description and/or shown in the attached drawings. The invention further pertains to a method or process comprising one or more of the characterising features described in the description and/or shown in the attached drawings.

It will be appreciated that the invention also applies to computer programs, particularly computer programs on or in a carrier, adapted to put the invention into practice. The program may be in the form of a source code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

The various aspects discussed in this patent can be combined in order to provide additional advantages. The mere fact that certain measures are recited in mutually different claims does not indicate that a combination of these measures cannot be used to advantage. Furthermore, some of the features can form the basis for one or more divisional applications.

What is claimed is:

1. A compounding system for dosing a compound in a container comprising a first Luer coupling end defining a first coupling axis, and comprising a first thread having a first screw thread end, and a first pitch;

wherein the compounding system comprises:

a Luer coupling holder for holding a second Luer coupling end defining a second coupling axis, and comprising a second screw thread having a second thread end, and a second pitch, wherein the first Luer coupling end and the second Luer coupling end are shaped to couple for forming a Luer coupling, and wherein the first thread and the second thread engage for establishing the Luer coupling;

a container holder for holding the container, wherein the Luer coupling holder and the container holder are arranged for aligning the first coupling axis and the second coupling axis;

a rotation actuator for rotating the container holder relative to the Luer coupling holder substantially around the first coupling axis;

a translation actuator for translating the container holder relative to the Luer coupling holder along the first coupling axis;

bias means arranged for biasing the first Luer coupling end and the second Luer coupling end when in contact in a direction of the first coupling axis;

a position sensor for sensing a container holder position of the container holder relative to the Luer coupling holder along the first coupling axis; and a controller configured for:

receiving the container holder position from the position sensor;

activating the translation actuator such that the two Luer coupling ends contact and the bias means are biased;

activating the rotation actuator when the first Luer coupling end and the second Luer coupling end contact in a non-engaging rotational direction;

detecting a rotational position of the first thread end relative to the second thread end based on a sudden change of the container holder position; and controlling the rotation actuator, and the translation actuator for bringing the first Luer coupling end and the second Luer coupling end into engagement for establishing the Luer coupling.

2. The compounding system according to claim 1, wherein the controller is configured for:

activating the translation actuator such that the two Luer coupling ends contact and the bias means are biased; and after biasing, activating the rotation actuator for engaging the two Luer coupling ends, wherein the bias is sufficient for providing the translation of the container along the first coupling axis.

3. The compounding system according to claim 1, wherein the bias is sufficient for providing a translation of the first Luer coupling end relative to the second Luer coupling end along the first coupling axis during the activation of at least 0.50 of the first pitch and/or the second pitch.

4. The compounding system according to claim 1, wherein the bias is sufficient for providing a translation of the first Luer coupling end relative to the second Luer coupling end along the first coupling axis during the activation of the rotation actuator in an engaging rotational direction of at least 0.25 of the first pitch and/or the second pitch.

5. The compounding system according to claim 1, wherein the bias means are sufficiently resilient for providing a translation of the first Luer coupling end relative to the second Luer coupling end along the first coupling axis during the activation of the rotation actuator in a non-engaging rotational direction of at least 0.50 of the first pitch and/or the second pitch.

6. The compounding system according to claim 1, wherein the controller is configured for:

after detecting a rotational position activating the rotation actuator in an engaging rotational direction; and determining when the Luer coupling is established based on an angular displacement of the first Luer coupling end relative to the second Luer coupling end.

7. The compounding system according to claim 1, wherein the controller is configured for:

after detecting a rotational position activating the rotation actuator in an engaging rotational direction; and determining when the Luer coupling is established based on the container holder position.

8. The compounding system according to claim 1, wherein the controller is configured for:

activating the rotation actuator when the first Luer coupling end and the second Luer coupling end contact such that the two Luer coupling ends engage; and determining when the Luer coupling is established based on the container holder position.

9. The compounding system according to claim 1, wherein the bias means comprises a spring, a leaf spring, recoil spring, elastic material, and/or resilient material.

10. The compounding system according to claim 1, wherein the compounding system comprises a sensor adapted for sensing rotation of the rotation actuator for establishing the Luer coupling; and wherein the controller is configured for switching off the rotation actuator when the sensed rotation falls below a rotation threshold.

11. The compounding system according to claim 10, wherein the sensed rotation is based on power applied to the rotation actuator; and wherein the controller is configured for switching off the rotation actuator when the sensed power is indicative of an established Luer coupling.

12. The compounding system according to claim 11, wherein the sensed power is based on the current supplied to and/or the voltage over the rotation actuator.

13. The compounding system according to claim 1, wherein the container is a medical container; and wherein the container comprises a container body having an elongated shape, wherein the elongated shape defines an elongated axis, and the elongated axis aligns with the first coupling axis.

14. The compounding system according to claim 1, wherein the container comprises flanges extending from the container body; and wherein the container holder is shaped for receiving the flanges for rotationally and/or translationally gripping the container.

15. The compounding system according to claim 1, wherein the first Luer coupling end, the second Luer coupling end, and the Luer coupling are respectively the first Luer lock coupling end, the second Luer lock coupling end, and the Luer lock coupling.

16. The compounding system according to claim 1, wherein the second Luer coupling end is a male or a female Luer coupling end.

17. The compounding system according to claim 1, comprising a tube, and wherein the tube is arranged for fluidly connecting a reservoir and the second Luer coupling end; and comprising a loading bay for loading a reservoir comprising the second Luer coupling end.

18. A method for controlling a compounding system for dosing a compound in a container comprising a first Luer coupling end defining a first coupling axis, and comprising a first thread having a first screw thread end, and a first pitch;

wherein the compounding system comprises:

a Luer coupling holder for holding a second Luer coupling end defining a second coupling axis, and comprising a second screw thread having a second thread end, and a second pitch, wherein the first Luer coupling end and the second Luer coupling end are shaped to couple for forming a Luer coupling, and wherein the first thread and the second thread engage for establishing the Luer coupling;

a container holder for holding the container, wherein the Luer coupling holder and the container holder are arranged for aligning the first coupling axis and the second coupling axis;

a rotation actuator for rotating the container holder relative to the Luer coupling holder substantially around the first coupling axis;

a translation actuator for translating the container holder relative to the Luer coupling holder along the first coupling axis;

bias means arranged for biasing the first Luer coupling end and the second Luer coupling end when in contact in a direction of the first coupling axis; and a position sensor for sensing a container holder position of the container holder relative to the Luer coupling holder along the first coupling axis;

wherein the method comprises the steps of:

receiving the container holder position from the position sensor;

activating the translation actuator such that the two Luer coupling ends contact and the bias means are biased;

activating the rotation actuator when the first Luer coupling end and the second Luer coupling end contact in a non-engaging rotational direction;

detecting a rotational position of the first thread end relative to the second thread end based on a sudden change of the container holder position; and controlling the rotation actuator, and the translation actuator for bringing the first Luer coupling end and the second Luer coupling end into engagement for establishing the Luer coupling.

19. The method according to claim 18, comprising the steps of:

activating the translation actuator such that the two Luer coupling ends contact and the bias means are biased; and after biasing, activating the rotation actuator for engaging the two Luer coupling ends, wherein the bias is sufficient for providing the translation of the container along the first coupling axis.

20. A computer program product comprising a non-transitory computer readable medium having computer readable code embodied therein, the computer readable code being configured such that, on execution by a suitable computer or processor, the computer or processor is caused to perform the method of claim 18.

* * * * *